United States Patent [19]

Takahashi

[11] Patent Number: 4,791,827

[45] Date of Patent: Dec. 20, 1988

[54] CAM DEVICE FOR PRESSURE REGULATING VALVE

[75] Inventor: Shigeo Takahashi, Aichi, Japan

[73] Assignee: Aisin Seiki Kabushiki Kaisha, Kariya, Japan

[21] Appl. No.: 912,539

[22] Filed: Sep. 29, 1986

[30] Foreign Application Priority Data

Sep. 30, 1985 [JP] Japan .................. 60-216975

[51] Int. Cl.⁴ .......................................... F16H 53/00
[52] U.S. Cl. ...................................... 74/567; 74/569
[58] Field of Search ............... 74/567, 569, 55, 57, 74/501 R, 501 B, 501 A; 251/251, 263, 294

[56] References Cited

U.S. PATENT DOCUMENTS

| | | | |
|---|---|---|---|
| 413,523 | 10/1889 | Kirker | 74/567 |
| 1,101,352 | 6/1914 | Sumbler | 74/567 |
| 1,603,853 | 10/1926 | Michell | 74/567 |
| 2,457,281 | 12/1948 | Shannon | 74/567 |
| 2,598,196 | 5/1952 | Staley | 74/567 X |
| 2,723,570 | 11/1955 | Hermann | 74/501 B X |
| 2,984,405 | 5/1961 | Stump | 74/567 X |
| 3,034,363 | 5/1962 | Vogel | 74/567 X |
| 3,469,660 | 9/1969 | Mathers | 74/567 X |
| 4,152,953 | 5/1979 | Headley | 74/55 X |
| 4,609,013 | 9/1986 | Takahashi | 251/251 X |

FOREIGN PATENT DOCUMENTS

| | | | |
|---|---|---|---|
| 957925 | 2/1957 | Fed. Rep. of Germany | 74/567 |
| 1146506 | 3/1985 | U.S.S.R. | 74/567 |
| 13126 | 6/1908 | United Kingdom | 74/567 |
| 128448 | 6/1919 | United Kingdom | 74/502 |
| 452609 | 8/1936 | United Kingdom | 74/569 |

Primary Examiner—Gary L. Smith
Assistant Examiner—Rodney M. Lindsey
Attorney, Agent, or Firm—Burns, Doane Swecker & Mathis

[57] ABSTRACT

In the conventional cam device for a pressure regulating valve, when the cam is rotated abruptly, a contact force between the roller and the cam surface decreases abruptly particularly during the cam return stroke. On the other hand, a rotational force also tends to be applied to the plunger during the plunger return stroke. Therefore, there exists a problem in that the roller rotates together with the plunger out of a correct engagement between the roller and the cam surface. To overcome this problem, the roller and the cam surface are engaged in convex and concave engagement relationship. A convex is formed in the roller and a concave is formed in the cam surface or vice versa.

12 Claims, 5 Drawing Sheets

CAM DEVICE FOR PRESSURE REGULATING VALVE

BACKGROUND OF THE INVENTION

The present invention relates to cam device for a pressure regulating valve which can reliably maintain a correct contact relationship between a cam surface and a roller.

In a hydraulic circuit incorporated with a planetary gearing of an automatic transmission gear box in order to effect engagement or disengagement of friction engaging means such as a brake or clutch mechanism, usually pressure regulating valves such as a throttle valve linked with an accelerator pedal, for instance, are employed. FIGS. 7 and 8 show an example of these valves. The pressure regulating valve 1 as of throttle valve shown in these drawings includes a plunger 3 urged by a pressure regulating spring 2. At one end of the plunger 3, a roller 5 is rotatably supported by the plunger 3 via a pin 4.

Further, a plate cam 8 is pivotably supported by a support axle 7 fixed to a stationary member by a bolt shaft 6. A cam surface 9 of this plate cam 8 is brought into contact with the outer periphery of the roller 5. A cam wire 10 is connected to the plate cam 8 with one end of the wire 10 fixed to the plate cam 8. The cam wire 10 moves back and forth, as shown by arrows in FIG. 8, according to the depression stroke of an accelerator pedal to pivot the plate cam 8 about the support axle 7, so that the roller 5 and the plunger 3 are reciprocably moved according to the profile of the cam surface 9 in order to controllably open or close one or more ports of the pressure regulating valve 1. Further, in FIG. 7, the reference numeral 11 denotes a return spring for the plate cam 8. FIG. 9 shows an example of the relationship between strokes of the plunger 3 and rotation angle of the plate cam 8, which indicates that the plunger 3 moves relatively rapidly with a steep gradient up to point a but gradually after point a.

In the conventional pressure regulating cam as described above, there exists a problem such that the roller 5 rotates through 90 degrees about the axis of the plunger 3, during operation, from a correct position, e.g., as shown in FIG. 7 to such a position as shown in FIG. 10, so that the roller 5 will not roll along the cam surface 9, thus resulting in a stoppage of the valve operation.

SUMMARY OF THE DISCLOSURE

The object of the present invention is to solve the afore-mentioned problem involved in the prior art pressure regulating valve. To achieve the afore-mentioned object, the pressure regulating valve according to the present invention comprises means for engaging the roller and the cam surface in concave and convex profiled engagement relationship in order to prevent the roller from being disengaged from the cam surface or vice versa.

According to the observation of the inventor, in the case where the plunger stroke changes with respect to the rotation angle of the cam as shown in FIG. 9, if the accelerator pedal is depressed abruptly, a contact force between the roller 5 and the cam surface 9 changes abruptly, so that the following-up operation of the roller 5 to the cam surface 9 is delayed, in particular, when the cam surface 9 is returned, and therefore the contact force between the roller 5 and the cam surface 9 decreases abruptly. On the other hand, since a torsional force is applied to the pressure regulating spring 2 of the valve 1 when the plunger 3 is pushed into the valve 1, this rotional force is released during the return stroke, so that a rotational force is applied to the plunger 3 during the plunger return stroke. Therefore, in case the above torsion of the pressure regulating spring 2 is released when the contact force between the roller 5 and the cam surface 9 is weak, although being also caused by other external forces, it is understandable that the roller 5 rotates about the axis of the plunger 3, as depicted in FIG. 10.

According to the present invention, however, since the roller and the cam surface are in contact with each other in concave and convex profiled engagement relationship, even if a rotational force is applied to the plunger of the pressure regulating valve about the axial direction of the plunger, the plunger is prevented from being rotated and therefore the normal contact relationship is maintained between the roller and the cam surface.

According to the present invention, since the contact relationship between the cam surface and the roller can be maintained without modifying the cam surface profile, it is possible to use the conventional pressure regulating valve as it is. Further, in a preferred embodiment, it is also possible to easily manufacture the cam plate by pressing plates and caulking then into an integral cam plate (or disc). Further, there exists another advantage such that the cam surface and the wire groove can be formed simultaneously. Furthermore, in order to prevent the roller from being rotated about the axis of the plunger, it is also possible to consider such as another method that the end of an elongated roller supporting pin is engaged with a slot or an elongated groove formed in a stationary member. In this structure, however, when a rotational force is applied to the plunger, the contact pressure between the pin and the slot increases and whereby the sliding resistance in the plunger reciprocation motion is unpreferably increased. In the present invention, however, no sliding resistance is produced in the plunger reciprocation motion, thus it is possible to maintain the responding ability of the plunger in stable and good conditions.

DESCRIPTION OF THE PREFERRED EMBODIMENTS

Embodiments of the present invention will be described with reference to FIGS. 1 to 6.

Figure 1:
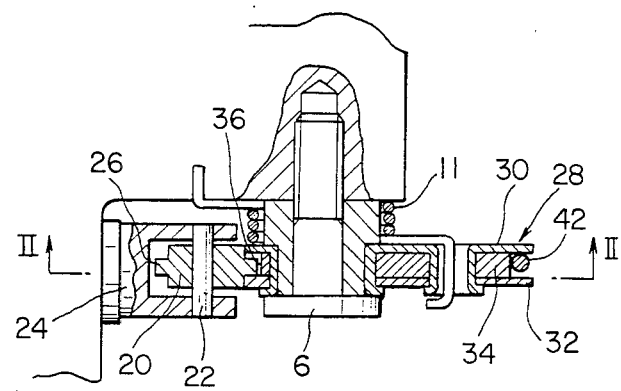
FIG. 1 is a cross-sectional view showing an embodiment of a cam device for the pressure regulating valve according to the present invention.
Figure 2:
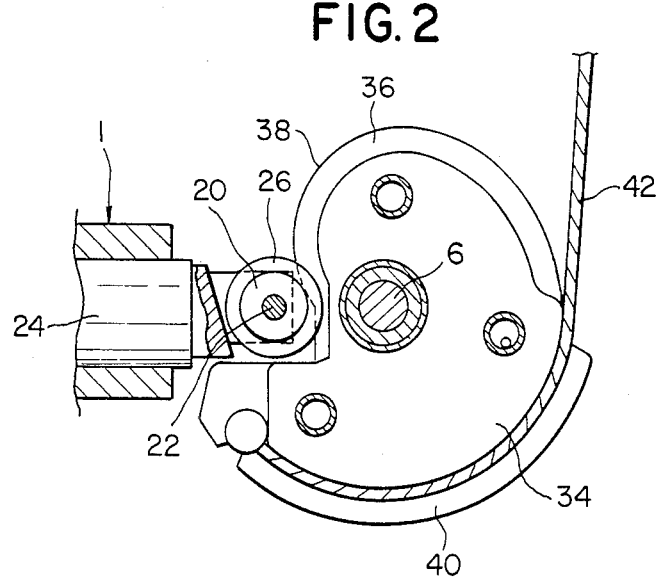
FIG. 2 is a cross-sectional view taken along the line II—II in FIG. 1.

FIGS. 1 and 2 show a first embodiment. A roller 20 supported by a pin 22 to a plunger 24 is formed with a convex 26 on the outer periphery thereof. On the other hand, a plate cam 28 comprises two side plates 30 and 32 and an intermediate plate 34 sandwiched by the two side plates 30 and 32. A concave groove 36 can be formed by reducing the diameter of the intermediate plate 34 and by caulking these three plates so as to be engageable with the convex 26 of the roller 20. The outer peripheral surface of the intermediate plate 34 serves as a cam surface 38. Further, a groove 40 for receiving a cam wire 42 can be formed simultaneously.

Figure 3:
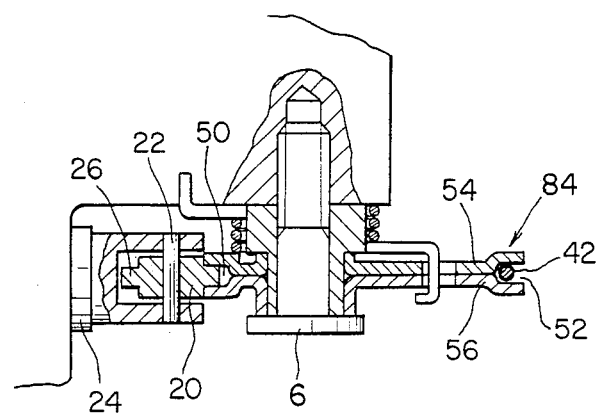
FIG. 3 is a cross-sectional view showing another embodiment of the cam device according to the present invention.

FIG. 3 shows a second embodiment. A concave groove 50 and a cam wire receiving groove 52 can be formed by outwardly bending the outer periphery of both the side plates 54 and 56 without use of an intermediate plate. The convex 26 of the roller 20 is engaged with this concave groove 50.

Figure 4:
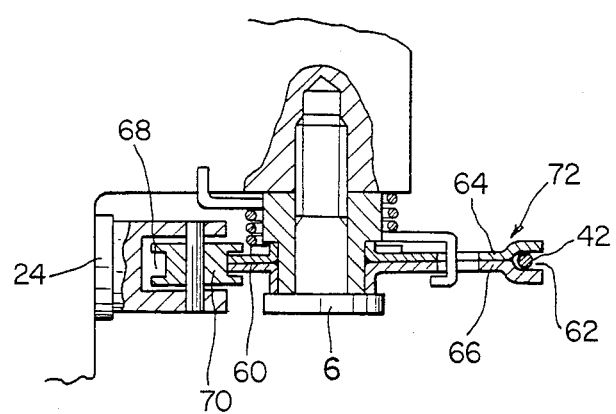
FIG. 4 is a cross-sectional view showing a further embodiment of the cam device according to the present invention.

FIG. 4 shows a third embodiment. A convex 60 and the cam wire receiving groove 62 are formed by the two side plates 64 and 66, while a concave groove 68 is so formed in the roller 70 as to be engaged with the convex 60 of the cam plate 72.

Figure 5:
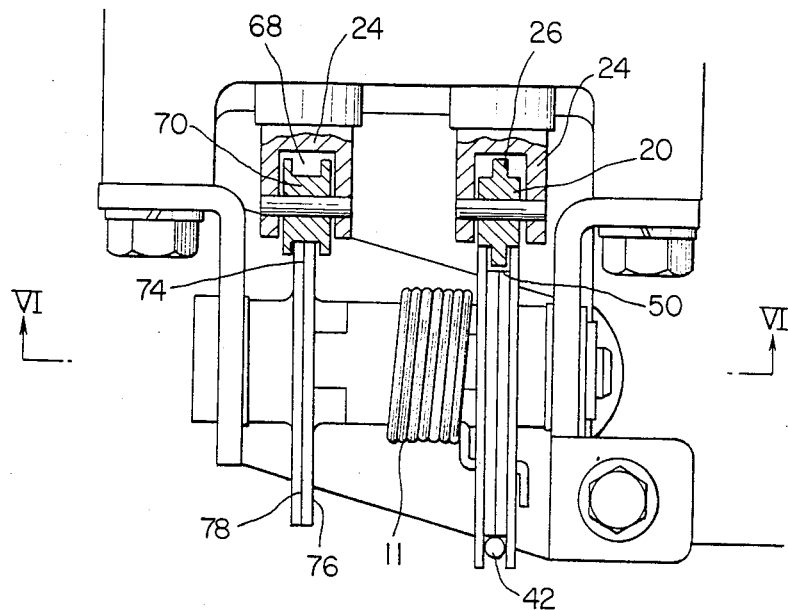
FIG. 5 is a cross-sectional view showing still another embodiment of the present invention.
Figure 6:
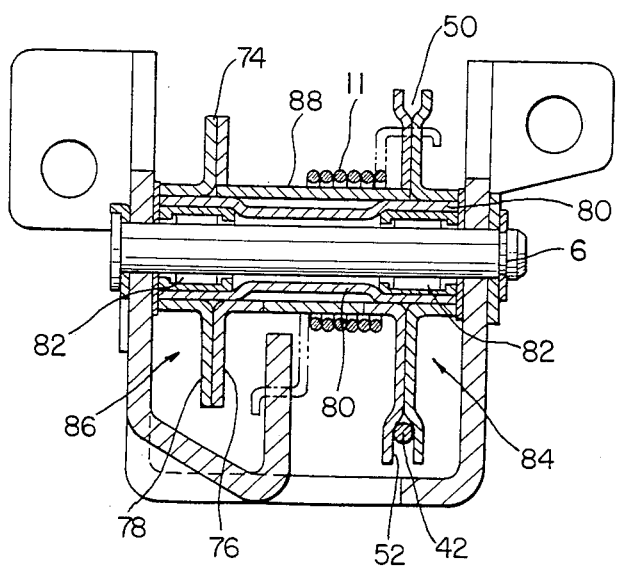
FIG. 6 is a cross-sectional view from the line VI—VI in FIG. 5.
Figure 7:
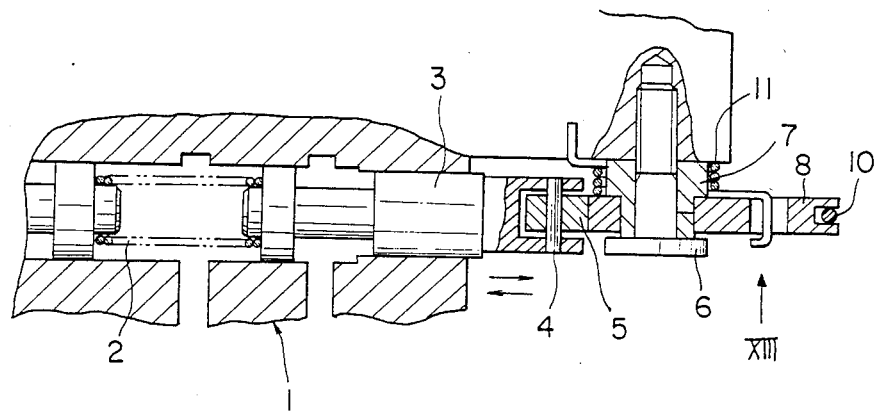
FIG. 7 is a plan view showing a conventional cam device.
Figure 8:
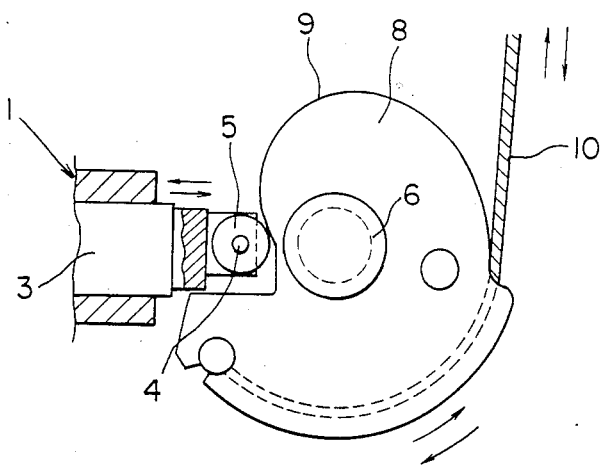
FIG. 8 is a side view seen along the arrow XIII in FIG. 7.
Figure 9:
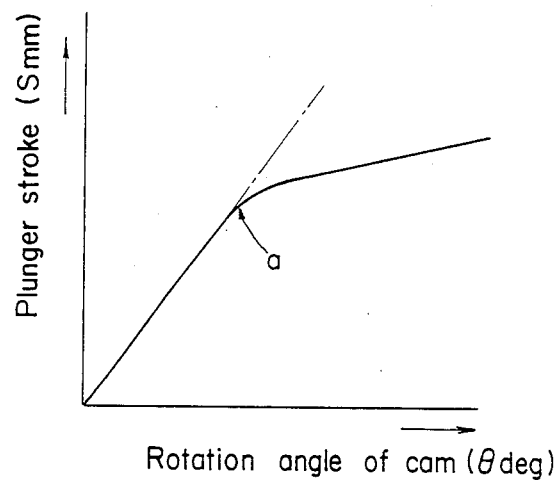
FIG. 9 is a graphical representation showing the relathionship between the cam rotation angle and the plunger stroke.
Figure 10:
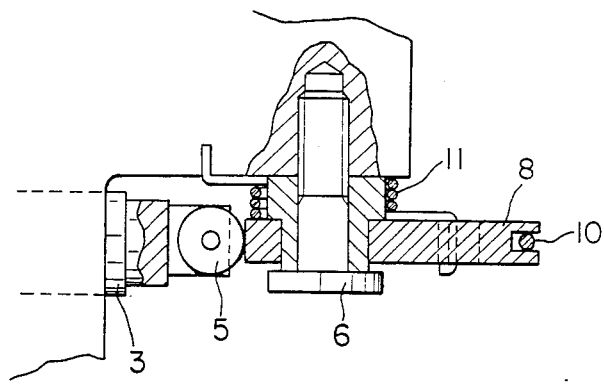
FIG. 10 is a cross-sectional view for assistance in explaining the problem involved in the prior art pressure regulating valve, in which the rollar is rotated through 90 degrees about the axis of the plunger out of the normal engagement.

FIGS. 5 and 6 show a fourth embodiment, which is suitably applied when a plurality of pressure regulating values are actuated according to the throttle opening rate. The engagement structure shown on the right side is substantially the same as that shown in FIG. 3. On the left side, a convex 74 is formed by simply joining two side plates 76 and 78 together. A sleeve 80 is disposed about the shaft 6 via two needle bearings 82. The two cam plates 84, 86 are connected to each other through a connecting member 88 so as to be rotatable together. The sleeve 80 is pressure-fitted to the two cam plates 84, 86. The two cam plates 84, 86 rotate according to the movement of the cam wire 42, and the two plungers 24 reciprocably move to and from according to the profile of each cam surface.

As described above, since the cam surface and the roller of the present invention are in contact with each other in convex-concave engagement relationship, it is possible to always maintain the initial normal contact relationship between the roller and the cam surface, even when a rotational force is applied to the plunger.

Modification may be made without departing from the gist and scope of the present invention as herein disclosed and claimed herein below.

What is claimed is:

1. A cam apparatus for a pressure regulating valve including:
   a roller having a roller surface and being rotatably supported at an end of a plunger of the pressure regulating valve;
   a plate cam having a cam surface in contact with said roller;
   a wire for rotating said plate cam;
   said plate cam further comprising at least two side plates coaxially disposed and secured to each other, at least one of the side plates having a hub portion bent from the side plate at a central portion thereof for rotatably supporting the plate cam on a support axle, one of said cam surface and said roller surface being a concave circumferential surface and the other of said cam surface and said roller surface being a convex circumferential surface;
   said plates forming a circumferentially extending groove for receiving said wire wound therein on a remaining circumferential portion of the plates other than the cam surface for rotating the plate cam.

2. The cam device as set forth in claim 1, wherein said plate cam further comprises an intermediate plate having a diameter smaller than that of the two side plates and sandwiched by the two side plates so as to form a concave surface engageable with a convex surface formed on said roller.

3. The cam device as set forth in claim 1, wherein said two side plates each has an outer periphery outwardly bent so as to form a concave surface engageable with a convex surface formed on said roller.

4. The cam device as set forth in claim 1, wherein said two side plates are joined together so as to form a convex surface engageable with a concave surface formed on said roller.

5. The cam device as set forth in claim 1, wherein said two side plates are joined together by caulking.

6. The cam device as set forth in claim 1, wherein said cam surface and said groove are formed as a continuous groove.

7. The cam device as set forth in claim 11, wherein said groove has a bottom continuous with an outer peripheral end of said cam surface.

8. The cam device as set forth in claim 1, wherein said cam device includes a plurality of rollers, and a plurality of plate cams associated with said rollers, respectively,
   said plate cams being coaxially joined to each other to form an integral body,
   one of the plate cams comprising two side plates each having an outer periphery outwardly bent so as to form a concave cam surface engageable with a convex roller surface formed on one of the rollers, and
   another plate cam comprising two side plates jointed together so as to form a convex cam surface engageable with a concave roller surface formed on another roller.

9. The cam device as set forth in claim 8, wherein said plate cams are joined together by means of a connecting member engaging with the hub portions.

10. The cam device as set forth in claim 9, wherein there is provided a sleeve between the axle and the hub portions for coaxially securing the plate cams.

11. A cam apparatus for a pressure regulating valve including:
    a roller having a convex circumferential roller surface and being rotatably supported at an end of a plunger of the pressure regulating valve;
    a plate cam having a cam surface in contact with said roller;
    a wire for rotating said plate cam;
    said plate cam comprising two side plates coaxially disposed and secured to each other, each having an outer periphery outwardly bent so as to form a concave surface engageable with said convex surface formed on said roller, at least one of the side plates having a hub portion bent from the side plate at a central portion thereof for rotatably supporting the plate cam on a support axle;

said two side plates forming a circumferentially extending groove, which is continuously formed with said cam surface, for receiving said wire wound therein on a remaining circumferential portion of the plates other than the cam surface for rotating the plate cam.

12. A cam apparatus for a pressure regulating valve including:

a roller having a convex circumferential roller surface and being rotatably supported at an end of a plunger of the pressure regulating valve;

a plate cam having a cam surface in contact with said roller;

a wire for rotating said plate cam;

said plate cam comprising two side plates coaxially disposed and secured to each other, at least one of the side plates having a hub portion bent from the side plate at a central portion thereof for rotatably supporting the plate cam on a support axle, and further comprising an intermediate plate having a diameter smaller than that of said two side plates and sandwiched by the two side plates so as to form a concave surface engageable with said convex surface formed on said roller;

said two side plates and said intermediate plate forming a circumferentially extending groove, which is continuously formed with said cam surface, for receiving said wire wound therein on a remaining circumferential portion of the plates other than the cam surface for rotating the plate cam.

* * * * *